US011510097B2

(12) United States Patent
Gervais

(10) Patent No.: US 11,510,097 B2
(45) Date of Patent: *Nov. 22, 2022

(54) ENVIRONMENT CONTROL DEVICE AND METHOD FOR INFERRING AN OPTIMAL WIRELESS DATA TRANSFER RATE USING A NEURAL NETWORK

(71) Applicant: Distech Controls Inc, Brossard (CA)

(72) Inventor: Francois Gervais, Lachine (CA)

(73) Assignee: Distech Controls Inc., Brossard (CA)

( * ) Notice: Subject to any disclaimer, the term of this patent is extended or adjusted under 35 U.S.C. 154(b) by 256 days.

This patent is subject to a terminal disclaimer.

(21) Appl. No.: 15/815,162

(22) Filed: Nov. 16, 2017

(65) Prior Publication Data

US 2019/0150028 A1 May 16, 2019

(51) Int. Cl.
*H04W 28/06* (2009.01)
*H04W 48/16* (2009.01)
*H04L 47/36* (2022.01)
*G06N 3/02* (2006.01)
*H04W 48/18* (2009.01)
(Continued)

(52) U.S. Cl.
CPC .............. *H04W 28/06* (2013.01); *G06N 3/02* (2013.01); *H04L 47/365* (2013.01); *H04W 24/02* (2013.01); *H04W 28/22* (2013.01); *H04W 48/16* (2013.01); *H04W 48/18* (2013.01); *H04W 28/021* (2013.01); *H04W 84/18* (2013.01)

(58) Field of Classification Search
CPC ..... H04W 28/06; H04W 48/16; H04W 48/18; H04W 28/021; H04W 84/18; G06N 3/02; H04L 47/365

USPC ........................................................ 370/235
See application file for complete search history.

(56) References Cited

U.S. PATENT DOCUMENTS 4,999,833 A 3/1991 Lee
7,450,523 B1 * 11/2008 Robertson ............. H04L 41/082
370/236
(Continued)

OTHER PUBLICATIONS

Non Final Office Action for U.S. Appl. No. 16/803,172, dated May 17, 2021, 43 pages. 2021.
(Continued)

*Primary Examiner* — Kibrom T Hailu
*Assistant Examiner* — Nizam U Ahmed
(74) *Attorney, Agent, or Firm* — RatnerPrestia

(57) ABSTRACT

Method and computing device for inferring an optimal wireless data transfer rate using a neural network. The method comprises storing a predictive model generated by a neural network training engine in a memory of a computing device. The method comprises determining, by a processing unit of the computing device, parameters of a data transfer through a wireless communication interface of the computing device. The method comprises executing, by the processing unit, a neural network inference engine using the predictive model for inferring an optimal data transfer rate based on the parameters of the data transfer through the wireless communication interface. The method comprises configuring the wireless communication interface to operate at the optimal data transfer rate. For example, the computing device consists of an environment control device (ECD). The ECD may consist of an environment controller, a sensor, a controlled appliance, and a relay.

20 Claims, 10 Drawing Sheets

(51) Int. Cl.
*H04W 28/22* (2009.01)
*H04W 24/02* (2009.01)
*H04W 28/02* (2009.01)
*H04W 84/18* (2009.01)

(56) References Cited

U.S. PATENT DOCUMENTS

| | | | |
|---|---|---|---|
| 10,187,313 B2 | 1/2019 | Natarajan et al. | |
| 2002/0047775 A1 | 4/2002 | del Castillo et al. | |
| 2002/0186660 A1* | 12/2002 | Bahadiroglu | H04L 29/06 370/248 |
| 2003/0012222 A1 | 1/2003 | Rinchiuso | |
| 2007/0043478 A1 | 2/2007 | Ehlers et al. | |
| 2009/0043407 A1 | 2/2009 | Mathiesen et al. | |
| 2010/0226349 A1 | 9/2010 | Matsuo et al. | |
| 2012/0092991 A1 | 4/2012 | Jeong et al. | |
| 2013/0117685 A1 | 5/2013 | Jang | |
| 2013/0201316 A1 | 8/2013 | Binder et al. | |
| 2014/0050087 A1 | 2/2014 | Pasotti et al. | |
| 2014/0337473 A1 | 11/2014 | Frusina et al. | |
| 2015/0019024 A1* | 1/2015 | Sabripour | G05D 23/1927 700/276 |
| 2015/0063374 A1 | 3/2015 | Venkatachalam Jayaraman et al. | |
| 2015/0146549 A1* | 5/2015 | Noriega | H04W 24/02 370/252 |
| 2015/0227841 A1 | 8/2015 | Laing et al. | |
| 2016/0105308 A1 | 4/2016 | Dutt | |
| 2016/0234342 A1 | 8/2016 | Oonk et al. | |
| 2017/0034316 A1 | 2/2017 | Pei et al. | |
| 2017/0111253 A1* | 4/2017 | Girish | H04W 4/02 |
| 2017/0172415 A1 | 6/2017 | Wik et al. | |
| 2017/0180440 A1 | 6/2017 | Schulz et al. | |
| 2017/0229009 A1 | 8/2017 | Foster et al. | |
| 2017/0264657 A1* | 9/2017 | Lee | H04L 43/16 |
| 2017/0286860 A1* | 10/2017 | Chen | G06N 3/08 |
| 2017/0318602 A1 | 11/2017 | Wang et al. | |
| 2018/0077025 A1 | 3/2018 | Helvey et al. | |
| 2018/0121601 A1* | 5/2018 | Hahm | G06F 19/18 |
| 2018/0198694 A1* | 7/2018 | Wells | H04L 67/1008 |
| 2019/0007997 A1 | 1/2019 | Shiotani et al. | |
| 2019/0044246 A1 | 2/2019 | Pitsillides et al. | |
| 2019/0065990 A1* | 2/2019 | Sharma | G06N 5/04 |
| 2019/0138899 A1 | 5/2019 | Hoshizuki et al. | |
| 2020/0364588 A1* | 11/2020 | Knox | H04L 67/125 |

OTHER PUBLICATIONS

Garcia-Hernandez et al., "Wireless Sensor Networks and Applications: a Survey", IJCSNS International Journal of Computer Science and Network Security, 2007, vol. 7, No. 3, pp. 264-273.
Entire Patent Prosecution History of U.S. Appl. No. 16/803,172, filed Feb. 27, 2020.
Notice of Allowance for U.S. Appl. No. 16/803,172, dated Nov. 8, 2021, 26 pages.

* cited by examiner ized set of rules would either by too simple to properly
ENVIRONMENT CONTROL DEVICE AND METHOD FOR INFERRING AN OPTIMAL WIRELESS DATA TRANSFER RATE USING A NEURAL NETWORK

TECHNICAL FIELD

The present disclosure relates to the field of environment control systems. More specifically, the present disclosure relates to an environment control device (ECD) and method for inferring an optimal wireless data transfer rate using a neural network.

BACKGROUND

Systems for controlling environmental conditions, for example in buildings, are becoming increasingly sophisticated. A control system may at once control heating and cooling, monitor air quality, detect hazardous conditions such as fire, carbon monoxide release, intrusion, and the like. Such control systems generally include at least one environment controller, which receives measured environmental values, generally from external sensors, and in turn determines set-points or command parameters to be sent to controlled appliances.

Communications between an environment controller and the devices under its control (sensors, controlled appliances, etc.) were traditionally based on wires. The wires are deployed in the building where the environment control system is operating, for instance in the walls, ceilings, and floors of multiple rooms in the building. Deploying wires in a building is usually disrupting for the daily operations in the building and costly. Thus, recently deployed environment controllers and devices under their control (sensors, controlled appliances, etc.) are using one or more wireless communication protocol (e.g. Wi-Fi, mesh, etc.) to exchange environmental data.

The environment controller and the devices under its control (sensors, controlled appliances, etc.) are generally referred to as Environment Control Devices (ECDs). An ECD comprises processing capabilities for processing data received via a wireless communication interface and/or generating data transmitted via the wireless communication interface.

The wireless communication interface is generally capable of operating at different data transfer rates. A driver of the wireless communication interface implements a simple algorithm for controlling the data transfer rate, which consists of trying to transfer data at the best possible data transfer rate. If this data transfer rate cannot be sustained, the driver lowers the data transfer rate to a lower value. This process is repeated until the selected data transfer rate can be sustained.

The ECDs may be operating in hostile conditions in terms of wireless data transmission (e.g. in industrial environments), which negatively affects the data transfer rate. Alternatively, the ECDs may be sharing an available wireless spectrum with other devices and competing with these other devices for access to the wireless spectrum, which also negatively affects the data transfer rate. Therefore, the data transfer rate of the ECDs need to be adapted on a regular basis, and the aforementioned process implemented by the driver of the wireless communication interface may be too long and not efficient.

An alternative process may consist in defining a set of rules taking into consideration current conditions for performing a wireless data transfer to select an optimal data transfer rate adapted to the current conditions. However, the parameters affecting the speed of a wireless data transfer are multiple, and are generally inter-related. Thus, the aforementioned set of rules would either by too simple to properly model the conditions for performing a wireless data transfer, or alternatively too complicated to be designed by a human being.

However, current advances in artificial intelligence, and more specifically in neural networks, can be taken advantage of to define a model taking into consideration current conditions for performing a wireless data transfer to select an optimal data transfer rate adapted to the current conditions.

Therefore, there is a need for a new environment control device (ECD) and method for inferring an optimal wireless data transfer rate using a neural network.

SUMMARY

According to a first aspect, the present disclosure relates to a computing device. The computing device comprises a wireless communication interface, memory for storing a predictive model generated by a neural network training engine, and a processing unit. The processing unit determines parameters of a data transfer through the wireless communication interface. The processing unit executes a neural network inference engine using the predictive model for inferring an optimal data transfer rate based on the parameters of the data transfer through the wireless communication interface. The processing unit configures the wireless communication interface to operate at the optimal data transfer rate.

According to a second aspect, the present disclosure relates to a method for inferring an optimal wireless data transfer rate using a neural network. The method comprises storing a predictive model generated by a neural network training engine in a memory of a computing device. The method comprises determining, by a processing unit of the computing device, parameters of a data transfer through a wireless communication interface of the computing device. The method comprises executing, by the processing unit, a neural network inference engine. The neural network inference engine uses the predictive model for inferring an optimal data transfer rate based on the parameters of the data transfer through the wireless communication interface. The method comprises configuring, by the processing unit, the wireless communication interface to operate at the optimal data transfer rate.

According to a third aspect, the present disclosure relates to a non-transitory computer program product comprising instructions executable by a processing unit of a computing device. The execution of the instructions by the processing unit of the computing device provides for inferring an optimal wireless data transfer rate using a neural network. More specifically, the execution of the instructions provides for storing a predictive model generated by a neural network training engine in a memory of the computing device. The execution of the instructions provides for determining, by the processing unit, parameters of a data transfer through a wireless communication interface of the computing device. The execution of the instructions provides for executing, by the processing unit, a neural network inference engine. The neural network inference engine uses the predictive model for inferring an optimal data transfer rate based on the parameters of the data transfer through the wireless communication interface. The execution of the instructions provides for configuring, by the processing unit, the wireless communication interface to operate at the optimal data transfer rate.

BRIEF DESCRIPTION OF THE DRAWINGS

Embodiments of the disclosure will be described by way of example only with reference to the accompanying drawings, in which.

DETAILED DESCRIPTION

Figure 1:
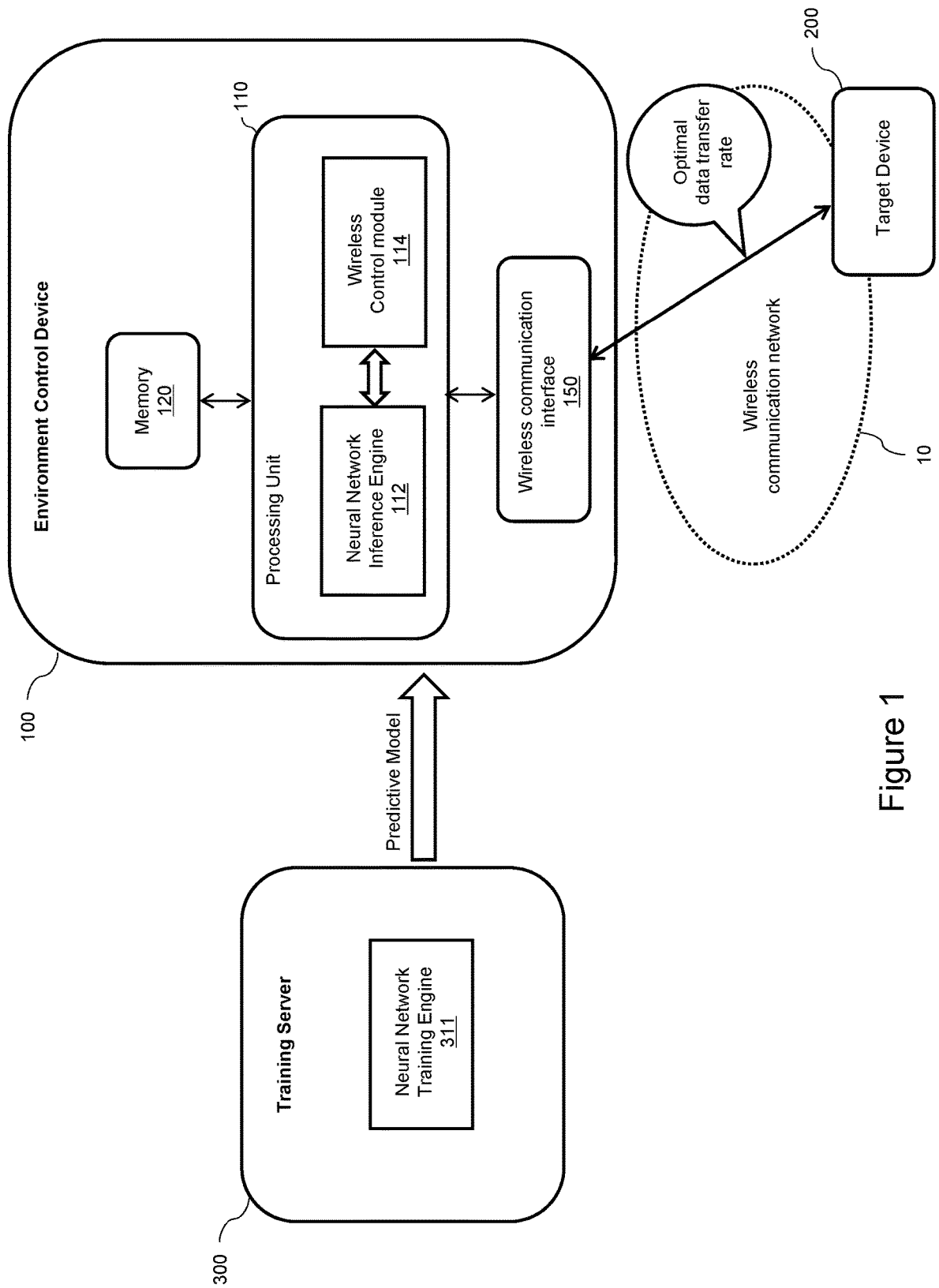
FIG. 1 illustrates an environment control device (ECD) capable of inferring an optimal wireless data transfer rate using a neural network.

The foregoing and other features will become more apparent upon reading of the following non-restrictive description of illustrative embodiments thereof, given by way of example only with reference to the accompanying drawings.

Various aspects of the present disclosure generally address one or more of the problems related to an optimization of a data transfer rate of a wireless communication interface of an environment control device (ECD), for exchanging environmental data with other components of an environment control system via the wireless communication interface.

TERMINOLOGY

The following terminology is used throughout the present disclosure:

Environment: condition(s) (temperature, pressure, oxygen level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Relay: device capable of relaying an environmental characteristic value from a sensor to an environment controller and/or relaying a command from an environment controller to a controlled appliance.

Environmental state: a current condition of an environment based on an environmental characteristic, each environmental state may comprise a range of values or verifiable representation for the corresponding environmental characteristic.

Wi-Fi: any Wireless Local Area Network (WLAN) product that is based on the Institute of Electrical and Electronics Engineers' (IEEE) 802.11 standards.

Wi-Fi Access Point: communication infrastructure allowing communications between devices using communication protocols based on the 802.11 standards. The Wi-Fi Access Point is established by a dedicated device (e.g. a particular ECD such as an environment controller). A device needs to associate with the Wi-Fi Access Point, before being capable of using it for communications with other devices. The Wi-Fi Access Point gives access to an existing Internet Protocol (IP) network, to which the dedicated device establishing the Wi-Fi Access Point is connected via a communication interface.

Figure 2A:
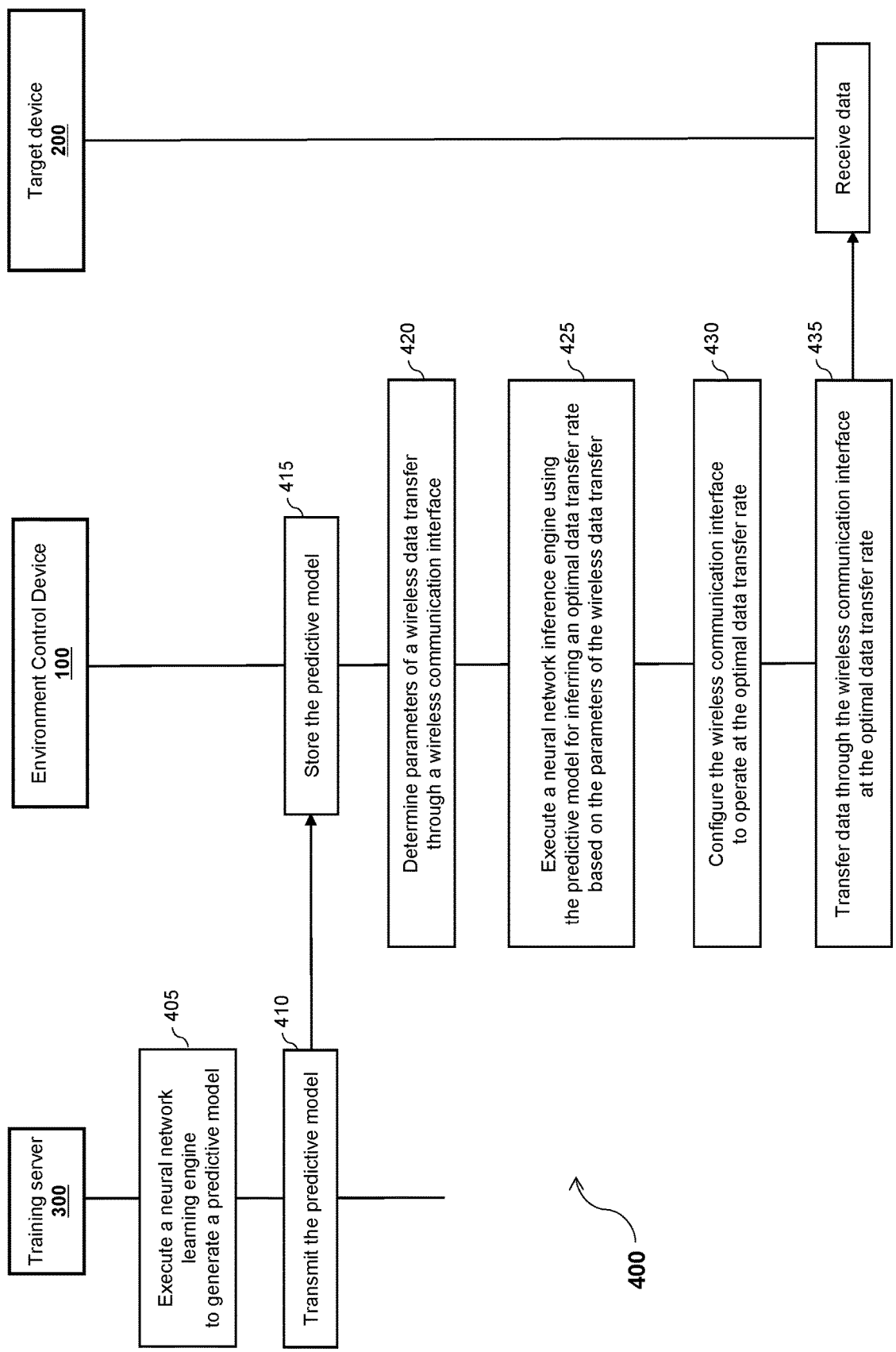
FIGS. 2A and 2B illustrate a method implemented by the ECD of FIG. 1 for inferring an optimal wireless data transfer rate using a neural network.
Figure 2B:
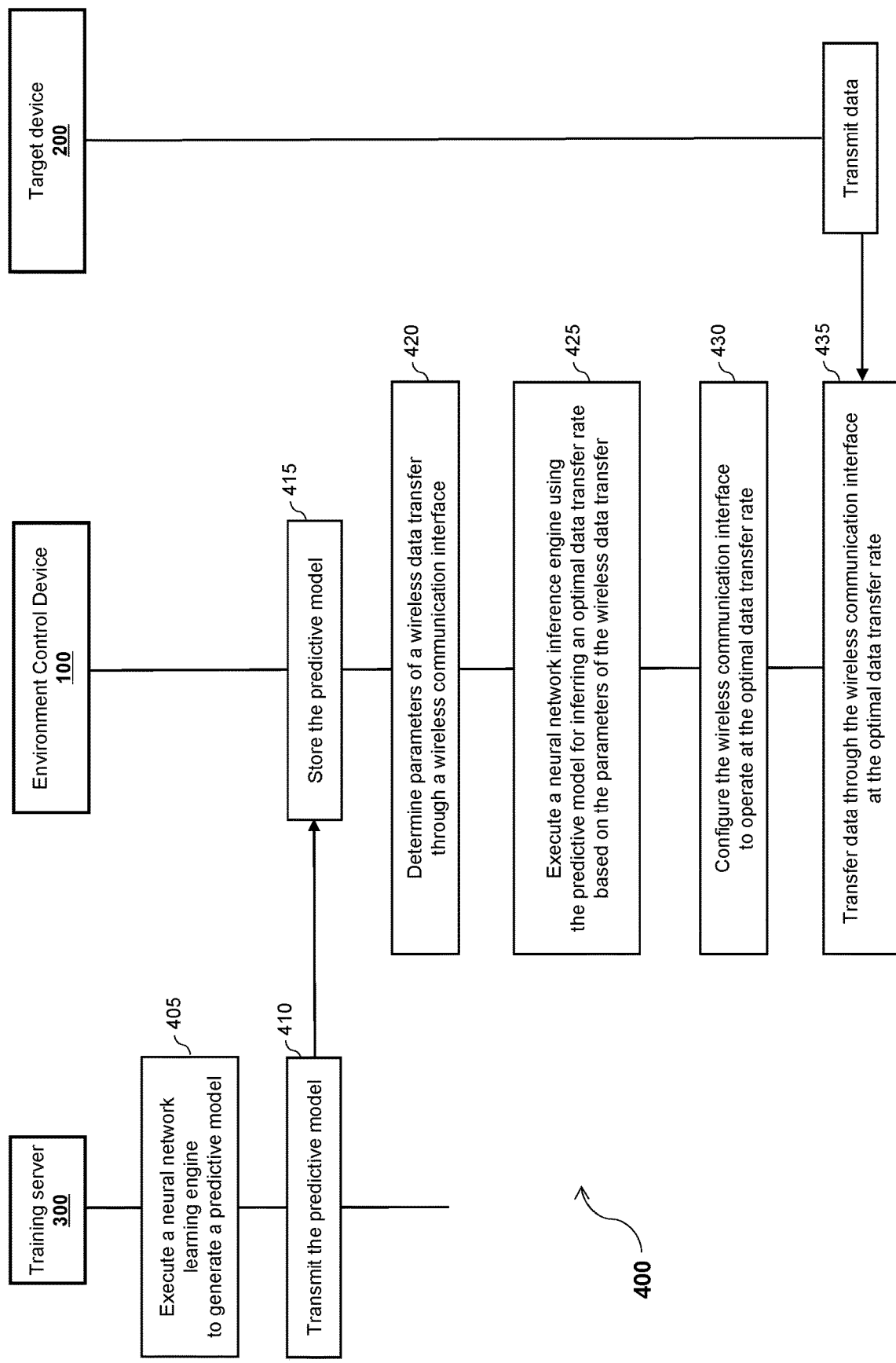

Referring now concurrently to FIGS. 1, 2A and 2B, an environment control device (ECD) 100 (represented in FIG. 1) and a method 400 (represented in FIGS. 2A and 2B) for inferring an optimal wireless data transfer rate using a neural network are illustrated.

The ECD 100 comprises a processing unit 110, memory 120, and a wireless communication interface 150. The ECD 100 may comprise additional components (not represented in FIG. 1 for simplification purposes), such as another communication interface, a user interface, a display, etc.

The processing unit 110 comprises one or more processors (not represented in FIG. 1) capable of executing instructions of a computer program. Each processor may further comprise one or several cores.

The memory 120 stores instructions of computer program (s) executed by the processing unit 110, data generated by the execution of the computer program(s), data received via the wireless communication interface 150 (or another communication interface), etc. Only a single memory 120 is represented in FIG. 1, but the ECD 100 may comprise several types of memories, including volatile memory (such as a volatile Random Access Memory (RAM)) and non-volatile memory (such as a hard drive).

The wireless communication interface 150 allows the ECD 100 to exchange data with one or more target device(s) 200 over a wireless communication network 10. For example, the wireless communication network 10 is a Wi-Fi network, and the wireless communication interface 150 is adapted to support communication protocols used to exchange data over the Wi-Fi network 10. Alternatively, the wireless communication network 10 is a wireless mesh network, and the wireless communication interface 150 is adapted to support communication protocols used to exchange data over the mesh network 10. Other types of wireless communication network 10 may also be supported by the wireless communication interface 150.

At least some of the steps of the method 400 are implemented by the ECD 100, to infer an optimal wireless data transfer rate using a neural network.

A dedicated computer program has instructions for implementing at least some of the steps of the method 400. The instructions are comprised in a non-transitory computer program product (e.g. the memory 120) of the ECD 100. The instructions provide for inferring an optimal wireless data transfer rate using a neural network, when executed by the processing unit 110 of the ECD 100. The instructions are deliverable to the ECD 100 via an electronically-readable media such as a storage media (e.g. CD-ROM, USB key, etc.), or via communication links (e.g. via the wireless communication network 10 through the wireless communication interface 150).

The dedicated computer program product executed by the processing unit 110 comprises a neural network inference engine 112 and a wireless control module 114.

Also represented in FIG. 1 is a training server 300. Although not represented in FIG. 1 for simplification purposes, the training server comprises a processing unit, memory and a communication interface. The processing unit of the training server 300 executes a neural network training engine 311.

The execution of the neural network training engine 311 generates a predictive model, which is transmitted to the ECD 100 via the communication interface of the training server 300. For example, the predictive model is transmitted over the wireless communication network 10 and received via the wireless communication interface 150 of the ECD 100. Alternatively, the predictive model is transmitted over another communication network not represented in FIG. 1 (e.g. a cellular network, a fixed Wide Area Network (WAN), etc.), and received via another communication interface of the ECD 100 not represented in FIG. 1. In still another alternative, the predictive model is transmitted over another communication network not represented in FIG. 1 (e.g. a cellular network, a fixed Wide Area Network (WAN), etc.) connected to the wireless communication network 10, and ultimately received via the wireless communication interface 150 of the ECD 100.

The method 400 comprises the step 405 of executing the neural network learning engine 311 (by the processing unit of the training server 300) to generate the predictive model.

The method 400 comprises the step 410 of transmitting the predictive model to the ECD 100, via the communication interface of the training server 300.

The method 400 comprises the step 415 of storing the predictive model in the memory 120 of the ECD 100. The predictive model is received via the wireless communication interface 150 (or another communication interface not represented in FIG. 1) of the ECD 100, and stored in the memory 120 by the processing unit 110.

The method 400 comprises the step 420 of determining parameters of a data transfer through the wireless communication interface 150. Step 420 is performed by the wireless control module 114 executed by the processing unit 110.

The method 400 comprises the step 425 of executing the neural network inference engine 112 (by the processing unit 110). The neural network inference engine 112 uses the predictive model (stored in memory 120 at step 415) for inferring an optimal data transfer rate based on the parameters of the data transfer through the wireless communication interface (determined at step 420).

The method 400 comprises the step 430 of configuring the wireless communication interface 150 to operate at the optimal data transfer rate (determined at step 425). Step 430 is performed by the wireless control module 114 executed by the processing unit 110.

The method 400 comprises the step 435 of transferring data (over the wireless communication network 10) through the wireless communication interface 150 at the optimal data transfer rate (configured at step 430). FIG. 2A illustrates an example where the optimal data transfer rate is an optimal data transmission rate, and data are transmitted by the ECD 100 to the target device 200 at the optimal data transmission rate. FIG. 2B illustrates another example where the optimal data transfer rate is an optimal data reception rate, and data are received by the ECD 100 from the target device 200 at the optimal data transmission rate. In still another example not represented in the Figures, the optimal data transfer rate is symmetric, and is both an optimal data transmission rate and an optimal data reception rate. Data are both transmitted by the ECD 100 to the target device 200 and received by the ECD 100 from the target device 200 at the symmetric optimal data transfer rate.

Step 420 is then repeated, and if one or more parameters of the data transfer through the wireless communication interface 150 change, then steps 425, 430 are performed before repeating step 435. If the parameters do not change at step 420, then step 435 is simply repeated without performing steps 425, 430. The optimal data transfer rate determined at the last occurrence of step 425 is used for repeating step 435 until a change in the parameters is detected at step 420. Step 420 is repeated on a regular basis, and the time interval between two occurrences of step 420 is a configurable parameter of the algorithm implementing the method 400. Furthermore, configurable thresholds can be used for the parameters at step 420, so that a change in the value of a parameter is not taken into consideration as long as it remains within the boundaries of the corresponding threshold(s). For example, if the parameter is an error rate (as will be illustrated later in the description), the threshold can be an increment of 5% in the error rate. In this case, if the error rate determined at the last occurrence of step 420 is 8%, steps 435 and 420 are repeated (without performing steps 425 and 430) until the error rate determined at step 420 becomes higher than 13% or lower than 3% (in which case steps 425 and 430 are performed).

Reference is now made to FIG. 1, and more particularly to the neural network inference engine 112 and the neural network training engine 311.

Various types of parameters of a data transfer through the wireless communication interface 150 may affect the achievable data transfer rate for this data transfer. The present disclosure aims at providing a mechanism for inferring an optimal data transfer rate which is as close as possible to the achievable data transfer rate. Thus, the present disclosure provides a mechanism for avoiding the following: try to transfer data at the highest data transfer rate possible, realize that this highest data transfer rate is not sustainable, and downgrade the data transfer rate to a more sustainable value. Instead, the mechanism disclosed in the present disclosure takes advantage of the neural network technology to directly "guess" the achievable data transfer rate.

Following are examples of parameters of a data transfer through the wireless communication interface 150, which are used as inputs of the neural network training engine 311 (during a training phase) and the neural network inference engine 112 (during an operational phase).

One parameter is the radio frequency at which the wireless communication interface 150 is operating. This radio frequency varies from one wireless technology to another (e.g. Wi-Fi or mesh). This radio frequency also varies for different standards of the same wireless technology (e.g. 802.11ac versus 802.11n for Wi-Fi). This radio frequency may also vary for the same standard (e.g. 20 or 40 megahertz (MHz) for the 802.11n), allowing the wireless communication interface 150 to operate at various radio frequencies.

Another parameter is the signal strength of the radio signal transmitted or received by the wireless communication interface 150. The signal strength can be measured by a driver of the wireless communication interface 150. For example, for Wi-Fi, the signal strength is represented as a quality in percentage. Alternatively, the signal strength is represented as a received signal strength indicator (RSSI) expressed in dBm (power ratio in decibels (dB) of the measured power referenced to one milliwatt (mW).

Still another parameter is the error rate. For example, for Wi-Fi, the driver of the wireless communication interface 150 measures a Packet Error Rate (PER) or a Bit Error Rate (BER). The error rate can be measured for a given interval, for instance the last 10 seconds, the last 30 seconds, the last minute, etc. Alternatively, the error rate can be measured for an amount of data transmitted and/or received, for instance the last N kilobytes, the last N Megabytes, etc. (where N is an integer).

Yet another parameter is the amount of data to be transmitted and/or received, which may have an impact on the achievable data transfer rate (possibly in combination with other parameters).

Still another parameter is the period of time (e.g. time and/or day) at which the data transfer occurs. Patterns may be discovered by a neural network for a group of ECDs 100 located in the same building, or in a specific section of the building. For example, a higher data transfer rate can be achieved at night, at specific periods of time during the day, during the week end, etc.

A person skilled in the art would readily understand that additional parameters may have an impact on the achievable data transfer rate, and can also be taken into consideration by the neural network inference engine 112 and the neural network training engine 311. Furthermore, a combination of the aforementioned parameters is taken into consideration by the neural network inference engine 112 and the neural network training engine 311. The best combination can be determined during the learning phase with the neural network training engine 311. The best combination may depend on the type of wireless technology (e.g. Wi-Fi or mesh), of a particular standard within a given wireless technology (e.g. 802.11ac versus 802.11n for Wi-Fi), of a particular location of the ECDs 100 (e.g. within a particular building, within a particular section of the building, etc.). The training phase can be used to identify the best combination of parameters, and only those parameters will be used by the neural network training engine 311 to generate the predictive model used by the neural network inference engine 112. Alternatively, all the available parameters can be used by the neural network training engine 311 to generate the predictive model. In this case, the neural network training engine 311 will simply learn to ignore the parameters which do not have a significant influence on the achievable data transfer rate.

During the learning phase, the neural network training engine 311 is trained with a plurality of inputs corresponding to the parameters of a data transfer through the wireless communication interface 150 and a corresponding plurality of outputs corresponding to the optimal data transfer rate. As is well known in the art of neural network, during the training phase, the neural network implemented by the neural network training engine 311 adjusts its weights. Furthermore, during the learning phase, the number of layers of the neural network and the number of nodes per layer can be adjusted to improve the accuracy of the model. At the end of the training phase, the predictive model generated by the neural network training engine 311 includes the number of layers, the number of nodes per layer, and the weights.

The inputs and outputs for the learning phase of the neural network can be collected through an experimental process. For example, a test ECD 100 is placed in various operating conditions corresponding to various values of the parameters of a data transfer through the wireless communication interface 150. For each set of values of the parameters, the optimal data transfer rate is determined and used as the output for the neural network.

Alternatively, the inputs and outputs for the learning phase of the neural network can be collected through a mechanism for collecting data while the ECD 100 is operating in real conditions. For example, a collecting software is executed by the processing unit 110 of the ECD 100. The collecting software records various operating conditions corresponding to various values of the parameters of a data transfer through the wireless communication interface 150. For each set of values of the parameters, the collecting software records the optimal data transfer rate as determined by the driver of the wireless communication interface 150. As mentioned previously, the optimal data transfer rate is determined by the driver of the wireless communication interface 150 by a sub-optimal procedure consisting in trying various decreasing data transfer rates, until a data transfer rate can be effectively sustained with the current operating conditions of the wireless communication interface 150.

Various techniques well known in the art of neural networks are used for performing (and improving) the generation of the predictive model, such as forward and backward propagation, usage of bias in addition to the weights (bias and weights are generally collectively referred to as weights in the neural network terminology), reinforcement learning, etc.

During the operational phase, the neural network inference engine 112 uses the predictive model (e.g. the values of the weights) determined during the learning phase to infer an output (optimal data transfer rate) based on inputs (parameters of a data transfer through the wireless communication interface 150), as is well known in the art.

The set of values for the optimal data transfer rate varies for each wireless technology (e.g. Wi-Fi and mesh), and for different standards of the same wireless technology (e.g. 802.11ac versus 802.11n for Wi-Fi). For example, the optimal data transfer is selected within a continuous range of values, for example within the range 2 to 20 Mhz. Alternatively, the optimal data transfer is selected among a set of discrete values. For example, for the 802.11ac standard, the optimal data transfer can be selected among the following values: 200, 400, 433, 600 and 867 Megabits per second (Mbps). For the 802.11n standard, the optimal data transfer can be selected among the following values: 1, 2, 5.5, 6, 9, 11, 12, 18, 24, 36, 48 and 54 Mbps.

Furthermore, in some cases, the optimal data transfer rate is symmetric: the same value is used for transmitting (optimal data transmission rate) and receiving data (optimal data reception rate). Alternatively, the optimal data transfer rate is asymmetric: a first value is used for transmitting (optimal data transmission rate) and a second value is used for receiving data (optimal data reception rate).

Reference is now made concurrently to FIGS. 3A, 3B, 3C, 3D and 3E, which illustrate exemplary environment control systems where the method 400 is applied. The ECD 100 represented in FIGS. 3A, 3B, 3C, 3D and 3E corresponds to the ECD 100 represented in FIG. 1 (with the neural network inference engine 112 and the wireless control module 114). The optimal data transfer rate of the wireless communication interface 150 is determined via the method 400. The training server 300 of FIG. 1 is not represented for simplification purposes.

The environment control systems represented in FIGS. 3A-E include various types of ECDs, such as environment controllers, sensors, controlled appliances, relays, etc. These ECDs interact in a manner well known in the art of environment control systems.

For example, a sensor detects an environmental characteristic and transmits corresponding environmental data (e.g. an environmental characteristic value) to an environment controller. Alternatively, a relay is used between the sensor and the environment controller, and the environmental data are received by the relay (via a first communication interface of the relay), and forwarded by the relay to the environment controller (via a second communication interface of the relay). The environment controller receives an environmental characteristic value from the sensor, and determines an environmental state based on the received environmental characteristic value. Then, the environment controller generates a command based on the environmental state, and transmits the command to a controlled appliance. The environmental characteristic value may be immediately processed upon reception by the environment controller, to generate the command. Alternatively, the environmental characteristic value may be stored in a memory of the environment controller, and processed later by the environment controller to generate the command. A command may also be generated based on several received environmental characteristic values. Alternatively, the relay is used between the environment controller and the controlled appliance, and the command is received by the relay (via the second communication interface of the relay), and forwarded by the relay to the controlled appliance (via the first communication interface of the relay).

Figure 3A:
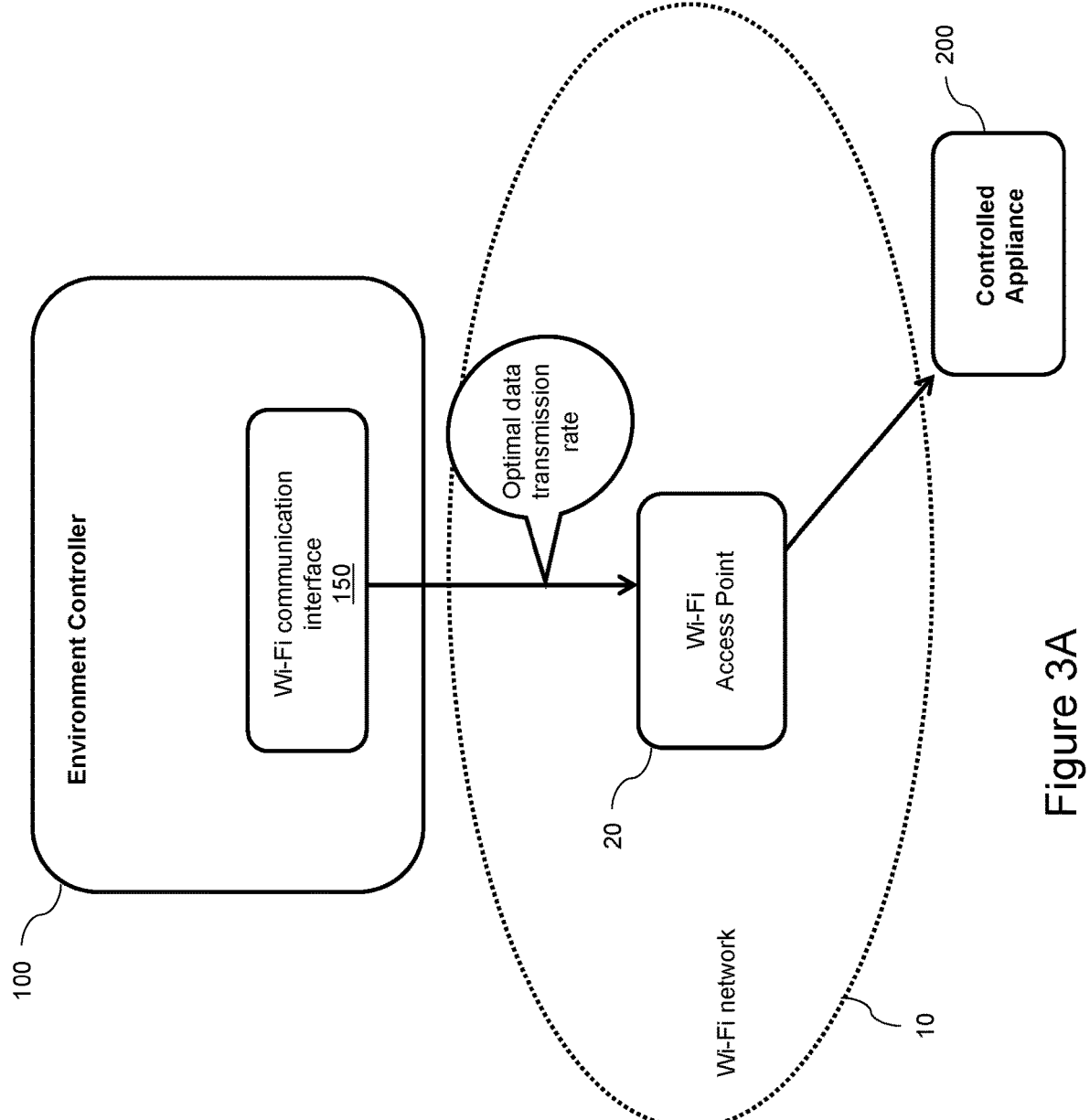
FIGS. 3A, 3B, 3C, 3D and 3E illustrate examples of ECDs implementing the methods illustrated in FIGS. 2A-B.

FIG. 3A illustrates a first configuration where the ECD 100 is an environment controller, and where the wireless communication interface 150 is a Wi-Fi communication interface. The wireless communication network 10 is a Wi-Fi network comprising a Wi-Fi access point 20. The target device 200 is a controlled appliance. The optimal data transfer rate is an optimal data transmission rate. The environment controller 100 transmits data (e.g. one or more commands) to the controlled appliance 200 via the Wi-Fi access point 20. The Wi-Fi communication interface 150 is configured to operate at the optimal data transmission rate for transmitting data to the Wi-Fi access point 20.

Figure 3B:
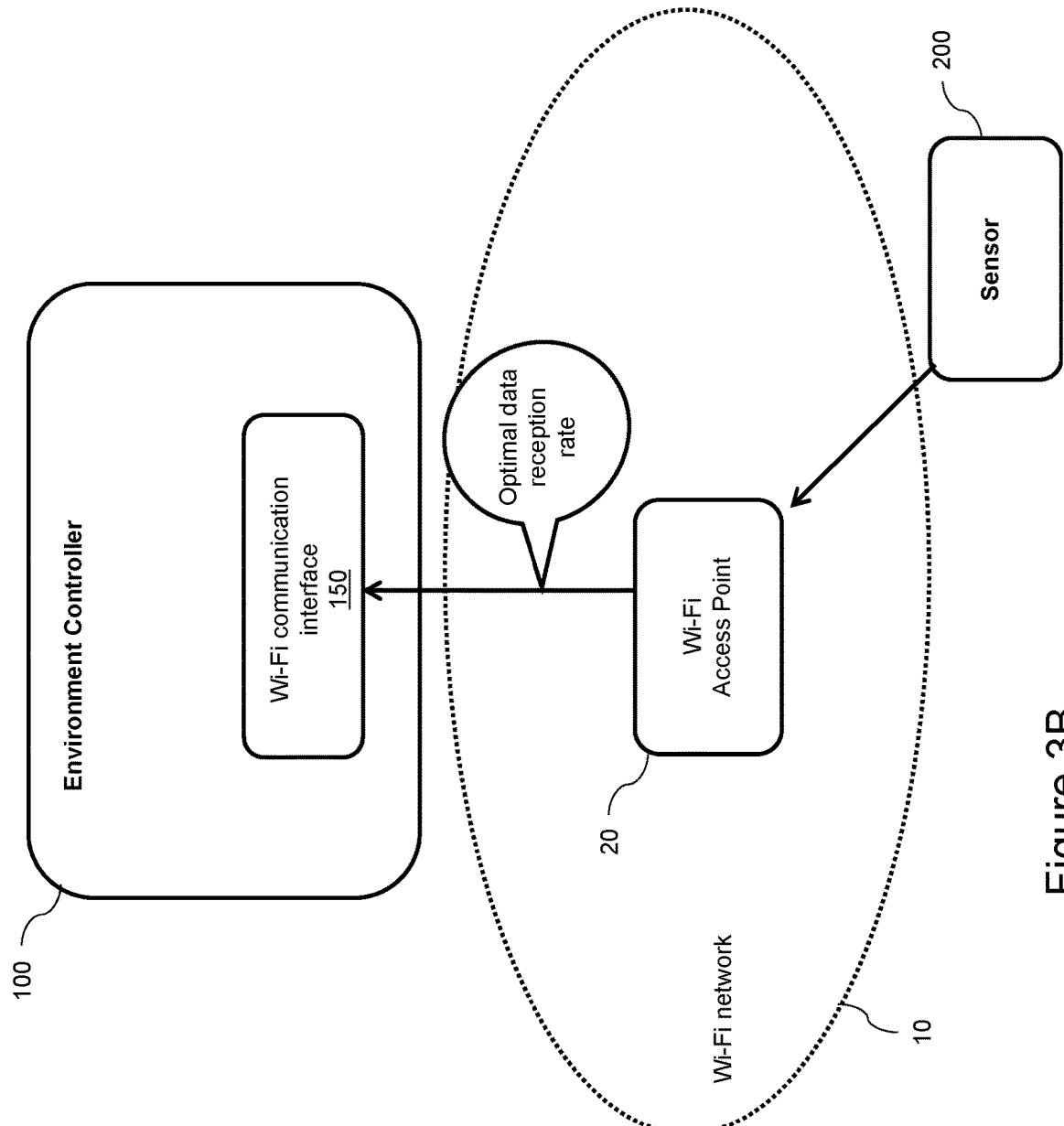

FIG. 3B illustrates a second configuration where the ECD 100 is an environment controller, and where the wireless communication interface 150 is a Wi-Fi communication interface. The wireless communication network 10 is a Wi-Fi network comprising the Wi-Fi access point 20. The target device 200 is a sensor. The optimal data transfer rate is an optimal data reception rate. The environment controller 100 receives data (e.g. one or more environmental characteristic values) from the sensor 200 via the Wi-Fi access point 20. The Wi-Fi communication interface 150 is configured to operate at the optimal data reception rate for receiving data from the Wi-Fi access point 20.

Figure 3C:
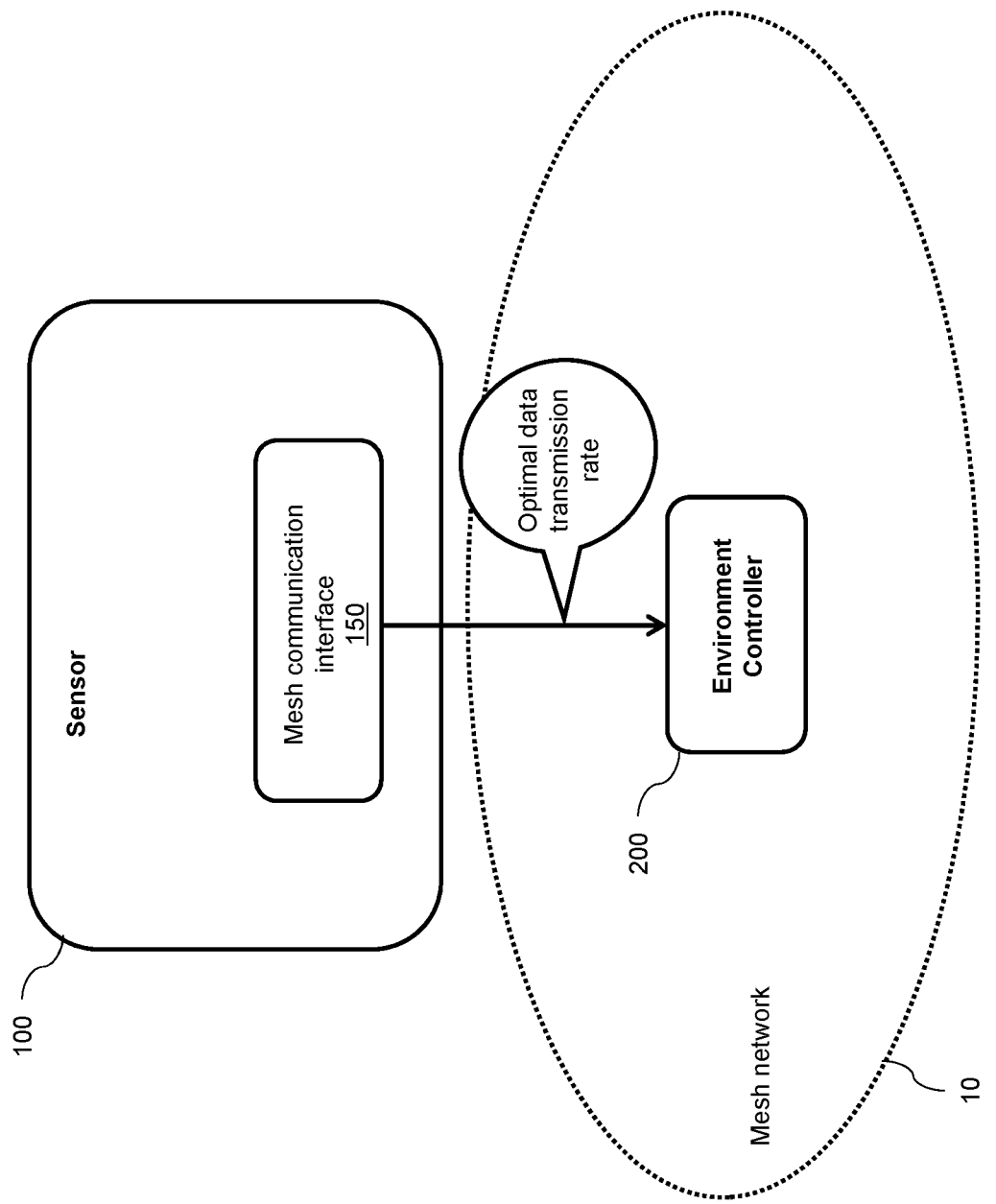

FIG. 3C illustrates a third configuration where the ECD 100 is a sensor, and where the wireless communication interface 150 is a mesh communication interface. The wireless communication network 10 is a mesh network. The target device 200 is an environment controller. The optimal data transfer rate is an optimal data transmission rate. The sensor 100 directly transmits data (e.g. one or more environmental characteristic values) to the environment controller 200. The mesh communication interface 150 is configured to operate at the optimal data transmission rate for directly transmitting data to the environment controller 200.

An example of sensor 100 for which the determination of the optimal data transfer rate is particularly useful is a camera. A camera generates a large amount of data, and trying to transmit these data at a transmission rate which is not adapted (too high) to the current operating conditions of the wireless network 10 may significantly deteriorate the effectively achieved data transmission rate.

Figure 3D:
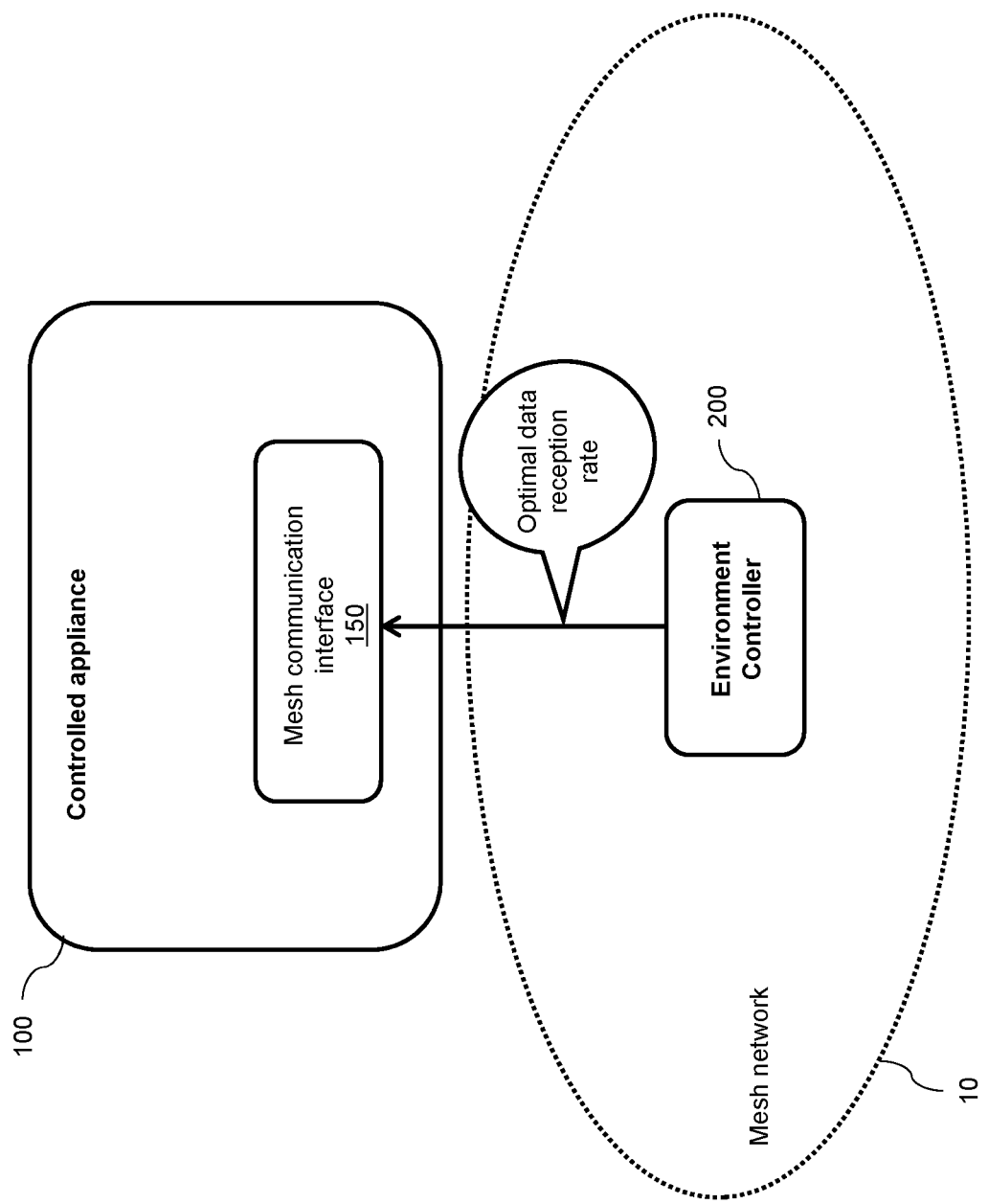

FIG. 3D illustrates a fourth configuration where the ECD 100 is a controlled appliance, and where the wireless communication interface 150 is a mesh communication interface. The wireless communication network 10 is a mesh network. The target device 200 is an environment controller. The optimal data transfer rate is an optimal data reception rate. The controlled appliance 100 directly receives data (e.g. one or more commands) from the environment controller 200. The mesh communication interface 150 is configured to operate at the optimal data reception rate for directly receiving data from the environment controller 200.

Figure 3E:
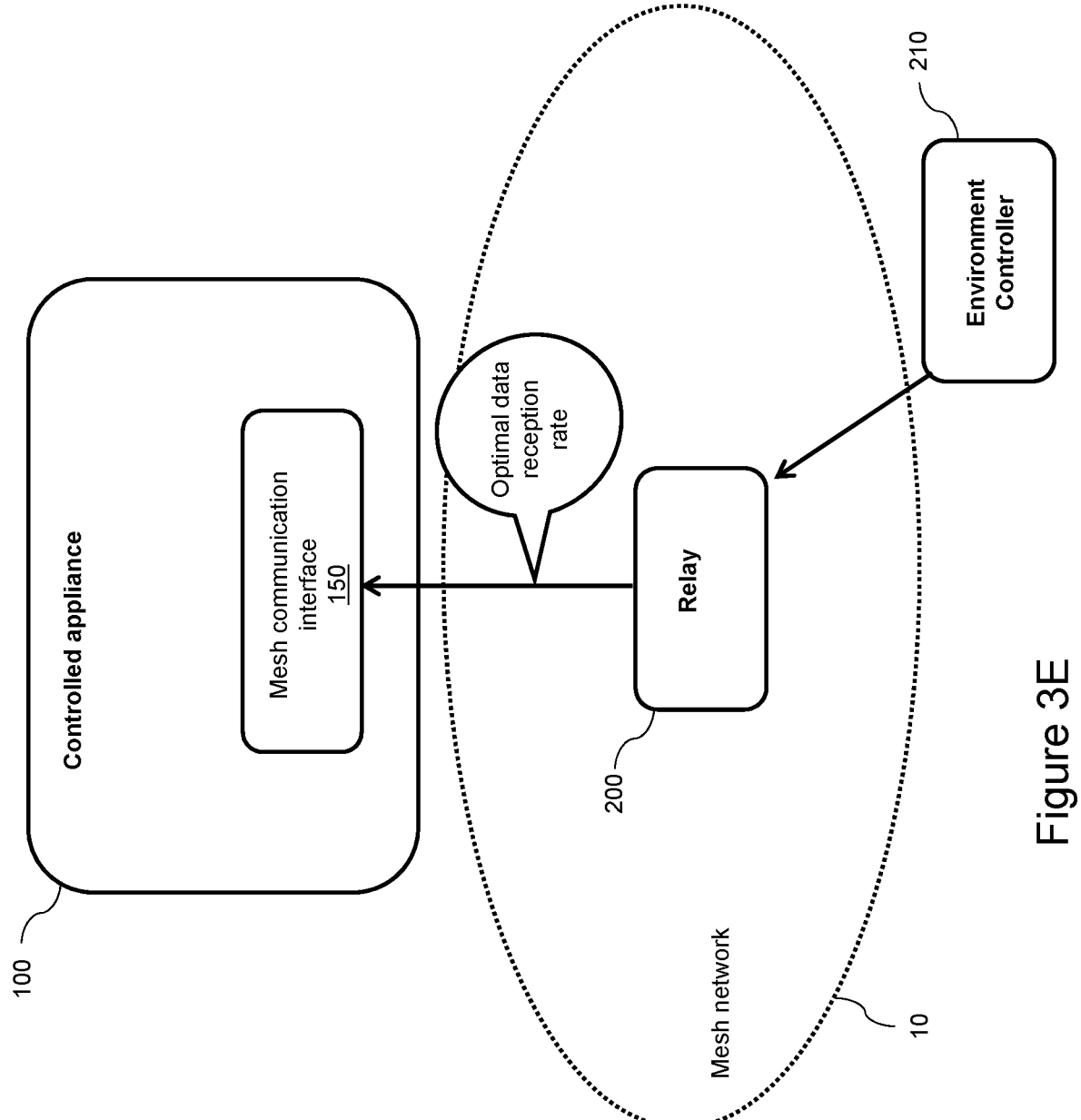

FIG. 3E illustrates a fifth configuration where the ECD 100 is a controlled appliance, and where the wireless communication interface 150 is a mesh communication interface. The wireless communication network 10 is a mesh network. The target device 200 is an environment controller. The optimal data transfer rate is an optimal data reception rate. The controlled appliance 100 directly receives data (e.g. one or more commands) from the relay 200. The data are generated by an environment controller 210 and transmitted to the relay 200, and further forwarded by the relay 200 to the controlled appliance 100. The mesh communication interface 150 is configured to operate at the optimal data reception rate for directly receiving the data from the relay 200.

A person skilled in the art would readily understand that other configurations of an environment control system can be supported by implementing the method 400. For example, with respect to FIGS. 3A and 3B, the Wi-Fi network 10 comprising the Wi-Fi Access Point 20 can be replaced by a mesh network, and the Wi-Fi communication interface 150 can be replaced by a mesh communication interface. Similarly, with respect to FIGS. 3C, 3D and 3E, the mesh network 10 can be replaced by a Wi-Fi network comprising a Wi-Fi Access Point, and the mesh communication interface 150 can be replaced by a Wi-Fi communication interface. Furthermore, FIGS. 3A and 3B can be combined, the Wi-Fi communication interface 150 (or alternatively a mesh communication interface) being configured to operate simultaneously at an optimal data transmission rate (for transmitting data to the controlled appliance 200 of FIG. 3A) and an optimal data reception rate (for receiving data from the sensor 200 of FIG. 3B). In a particular case, a symmetric optimal data transfer rate is configured in place of independent data transmission and data reception rates.

With respect to FIG. 3A, the ECD 100 may transmit data to a plurality of controlled appliances 200 via the Wi-Fi Access Point 20. The optimal data transmission rate applies to any transmission of data to one of the plurality of controlled appliances 200 via the Wi-Fi Access Point 20.

With respect to FIG. 3B, the ECD 100 may receive data from a plurality of sensors 200 via the Wi-Fi Access Point 20. The optimal data reception rate applies to any reception of data from one of the plurality of the sensors 200 via the Wi-Fi Access Point 20.

With respect to FIG. 3C, the sensor 100 may transmit data to a plurality of ECDs 200 over the mesh network 20. The optimal data transmission rate applies to any transmission of data to one of the plurality of ECDs 200 over the mesh network 20.

With respect to FIG. 3D, the controlled appliance 100 may receive data to a plurality of ECDs 200 over the mesh network 20. The optimal data reception rate applies to any reception of data from one of the plurality of ECDs 200 over the mesh network 20.

With respect to FIGS. 3A and 3B, the Wi-Fi communication interface 150 may alternatively use the Wi-Fi Direct standard to directly transmit data to the controlled appliance 200 in FIG. 3A, and to directly received data from the sensor 200 in FIG. 3B, without using the intermediate Wi-Fi Access Point 20. Wi-Fi Direct is a Peer-to-Peer Wi-Fi technology functionally similar to the mesh technology illustrated in FIGS. 3C, 3D and 3E.

Reference is now made concurrently to FIGS. 1, 2A, 2B and 4, which illustrate the usage of the method 400 in a large environment control system.

A first plurality of ECDs 100 implementing the method 400 are deployed at a first location. Only two ECDs 100 are represented for illustration purposes, but any number of ECDs 100 may be deployed.

A second plurality of ECDs 100 implementing the method 400 are deployed at a second location. Only one ECD 100 is represented for illustration purposes, but any number of ECDs 100 may be deployed.

The first and second locations may consist of different buildings, different floors of the same building, etc. Only two locations are represented for illustration purposes, but any number of locations may be considered.

The ECDs 100 correspond to the ECDs represented in FIG. 1, and execute both the wireless control module 114 and the neural network inference engine 112. Each ECD 100 receives a predictive model from the centralized training server 300 (e.g. a cloud based training server 300 in communication with the ECDs 100 via a networking infrastructure, as is well known in the art). The same predictive model is used for all the ECDs. Alternatively, a plurality of predictive models is generated, and takes into account specific operating conditions of the ECDs 100. For example, a first predictive model is generated for the ECDs using a Wi-Fi communication interface 150, and a second predictive model is generated for the ECDs using a mesh communication interface 150. Furthermore, different predictive models can be generated for different implementations of the same networking technology (e.g. different predictive models for different implementations of the Wi-Fi protocols, and different predictive models for different implementations of the mesh protocols).

Figure 4:
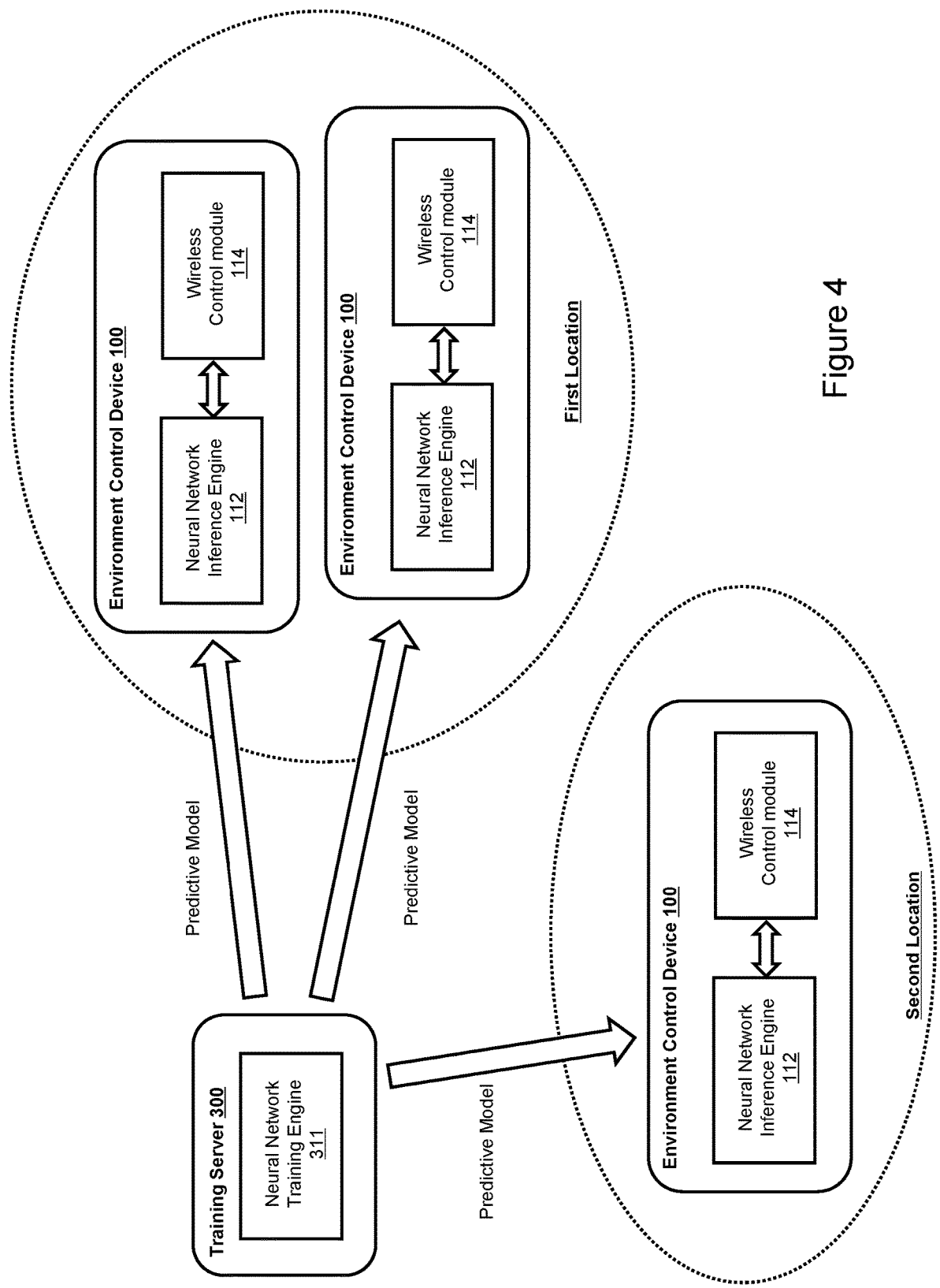
FIG. 4 represents an environment control system where ECDs implementing the method illustrated in FIGS. 2A-B are deployed.

FIG. 4 illustrates a decentralized architecture, where the ECDs 100 take autonomous decisions for optimizing the data transfer rate of the wireless communication interface 150, using the predictive model as illustrated in the method 400.

The present disclosure focuses on ECDs for implementing the method 400 in FIGS. 2A-B consisting in inferring an optimal wireless data transfer rate using a neural network. However, other types of computing devices with a processing unit, memory and a wireless communication interface can benefit from the present methods. These computing devices implement the method 400 in the same manner than the ECD 100 represented in FIGS. 1, 3A-3E and 4.

Figure 5:
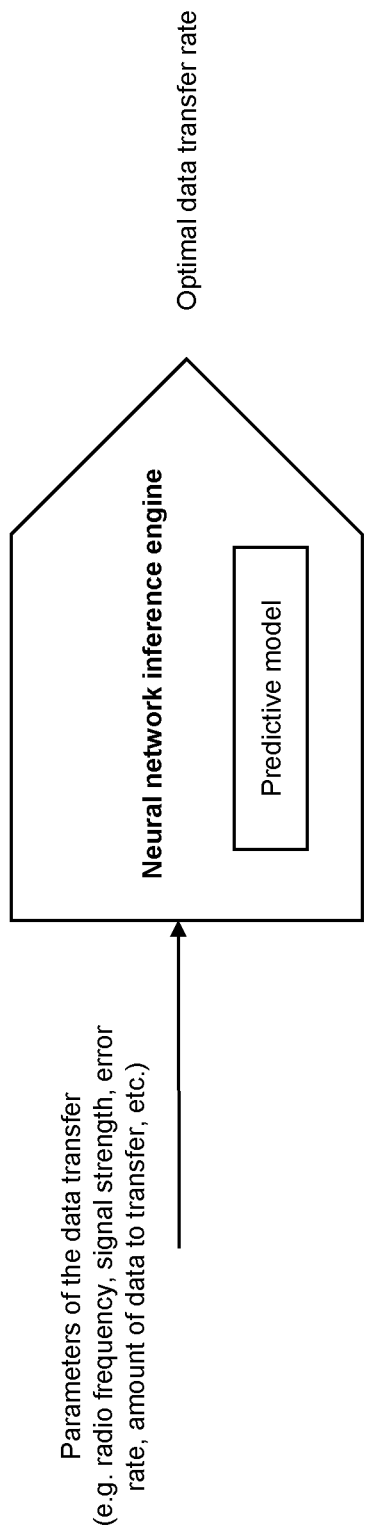
FIG. 5 is a schematic representation of the neural network inference engine executed by the ECD of FIG. 1.

Reference is now made to FIG. 5, which illustrates the aforementioned neural network inference engine with its inputs and its output. FIG. 5 corresponds to the neural network inference engine 112 executed at step 425 of the method 400, as illustrated in FIGS. 1, 2A and 2B.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A computing device, comprising:
a wireless communication interface;
memory for storing a predictive model of a neural network generated by a neural network training engine, the predictive model comprising weights of the neural network; and
a processing unit for:
determining an amount of data to transfer through the wireless communication interface and at least one additional parameter characterizing operating conditions of the data transfer through the wireless communication interface;
executing a neural network inference engine using the predictive model of the neural network for inferring an output of the neural network based on inputs of the neural network, the output of the neural network consisting of an optimal data transfer rate of the wireless communication interface, the inputs of the neural network comprising the amount of data to transfer through the wireless communication interface and the at least one additional parameter characterizing the operating conditions of the data transfer through the wireless communication interface; and
configuring the wireless communication interface to operate at the optimal data transfer rate;
wherein the optimal data transfer rate is one of an optimal data transmission rate, an optimal data reception rate, or a symmetrical optimal data transfer rate.

2. The computing device of claim 1, wherein the data transfer is a transmission of data by the computing device through the wireless communication interface and the optimal data transfer rate is the optimal data transmission rate.

3. The computing device of claim 1, wherein the data transfer is a reception of data by the computing device through the wireless communication interface and the optimal data transfer rate is the optimal data reception rate.

4. The computing device of claim 1, wherein the at least one additional parameter characterizing the operating conditions of the data transfer through the wireless communication interface comprises at least one of the following: a radio frequency, a signal strength, an error rate, and a period of time at which the data transfer occurs.

5. The computing device of claim 1, wherein the wireless communication interface is one of the following: a Wi-Fi communication interface, and a mesh communication interface.

6. The computing device of claim 1, wherein the computing device consists of an environment control device (ECD).

7. The computing device of claim 6, wherein the ECD consists of one of the following: an environment controller, a sensor, a controlled appliance, and a relay.

8. The computing device of claim 1, wherein the execution of the neural network inference engine is performed upon determining changes which exceed a threshold for one of the amount of data to transfer through the wireless communication interface and the at least one additional parameter characterizing the operating conditions of the data transfer through the wireless communication interface.

9. The computing device of claim 1, wherein the data transfer is a transmission or a reception of data by the computing device through the wireless communication interface and the optimal data transfer rate is the symmetrical optimal data transfer rate.

10. A method for inferring an optimal wireless data transfer rate using a neural network, the method comprising:
storing a predictive model of a neural network generated by a neural network training engine in a memory of a computing device, the predictive model comprising weights of the neural network;
determining by a processing unit of the computing device an amount of data to transfer through a wireless communication interface of the computing device and at least one additional parameter characterizing operating conditions of the data transfer through the wireless communication interface;
executing by the processing unit a neural network inference engine using the predictive model of the neural network for inferring an output of the neural network based on inputs of the neural network, the output of the neural network consisting of an optimal data transfer rate of the wireless communication interface based on, the inputs of the neural network comprising the amount of data to transfer through the wireless communication interface and the at least one additional parameter characterizing operating conditions of the data transfer through the wireless communication interface; and
configuring by the processing unit the wireless communication interface to operate at the optimal data transfer rate;
wherein the optimal data transfer rate is one of an optimal data transmission rate, an optimal data reception rate, or a symmetrical optimal data transfer rate.

11. The method of claim 10, wherein the data transfer is a transmission of data by the computing device through the wireless communication interface and the optimal data transfer rate is the optimal data transmission rate.

12. The method of claim 10, wherein the data transfer is a reception of data by the computing device through the wireless communication interface and the optimal data transfer rate is the optimal data reception rate.

13. The method of claim 10, wherein the at least one additional parameter characterizing the operating conditions of the data transfer through the wireless communication interface comprises at least one of the following: a radio frequency, a signal strength, an error rate, and a period of time at which the data transfer occurs.

14. The method of claim 10, wherein the computing device consists of one of the following: an environment controller, a sensor, a controlled appliance, and a relay.

15. The method of claim 10, wherein the execution of the neural network inference engine is performed upon determining changes which exceed a threshold for one of the amount of data to transfer through the wireless communication interface and the at least one additional parameter characterizing the operating conditions of the data transfer through the wireless communication interface.

16. The method of claim 10, wherein the data transfer is a transmission or a reception of data by the computing device through the wireless communication interface and the optimal data transfer rate is the symmetrical optimal data transfer rate.

17. A non-transitory computer program product comprising instructions executable by a processing unit of a computing device, the execution of the instructions by the processing unit of the computing device providing for inferring an optimal wireless data transfer rate using a neural network by:
storing a predictive model of a neural network generated by a neural network training engine in a memory of the computing device, the predictive model comprising weights of the neural network;
determining by the processing unit an amount of data to transfer through a wireless communication interface of the computing device and at least one additional parameter characterizing operating conditions of the data transfer through the wireless communication interface;
executing by the processing unit a neural network inference engine using the predictive model of the neural network for inferring an output of the neural network based on inputs of the neural network, the output of the neural network consisting of an optimal data transfer rate of the wireless communication interface based on, the inputs of the neural network comprising the amount of data to transfer through the wireless communication interface and the at least one additional parameter characterizing operating conditions of the data transfer through the wireless communication interface; and
configuring by the processing unit the wireless communication interface to operate at the optimal data transfer rate;
wherein the optimal data transfer rate is one of an optimal data transmission rate, an optimal data reception rate, or a symmetrical optimal data transfer rate.

18. The non-transitory computer program product of claim 17, wherein the at least one additional parameter characterizing the operating conditions of the data transfer through the wireless communication interface comprises at least one of the following: a radio frequency, a signal strength, an error rate, and a period of time at which the data transfer occurs.

19. The non-transitory computer program product of claim 17, wherein the computing device consists of one of the following: an environment controller, a sensor, a controlled appliance, and a relay.

20. The non-transitory computer program product of claim 17, wherein the execution of the neural network inference engine is performed upon determining changes which exceed a threshold for one of the amount of data to transfer through the wireless communication interface and the at least one additional parameter characterizing the operating conditions of the data transfer through the wireless communication interface.

* * * * *